W. H. METZ.
SPRING WHEEL.
APPLICATION FILED JUNE 24, 1918.
1,331,716.
Patented Feb. 24, 1920.
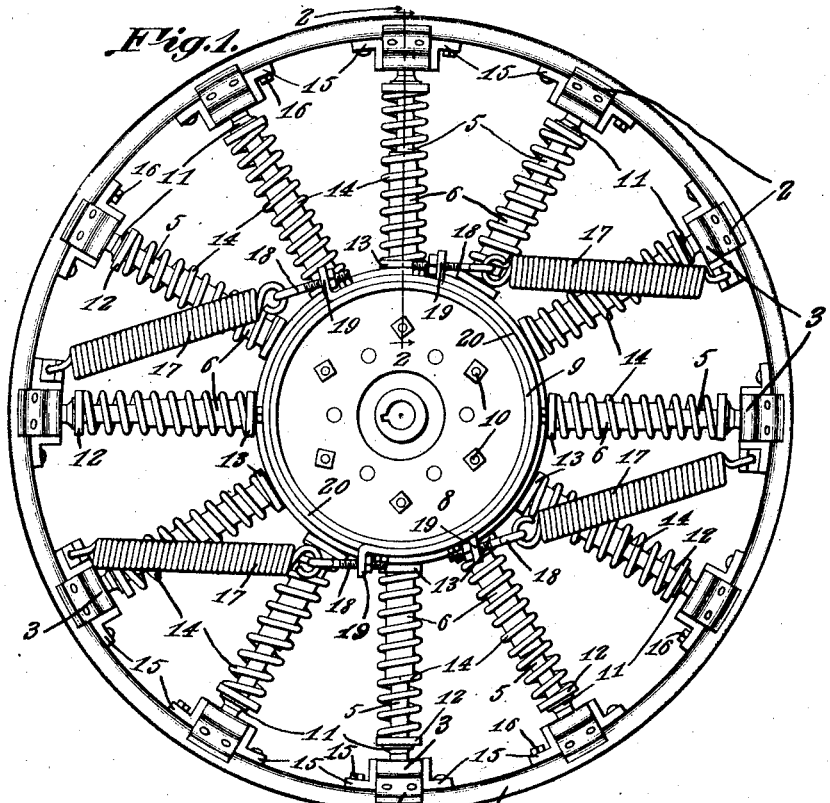
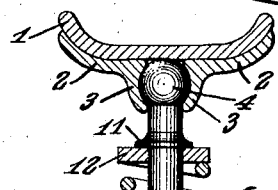
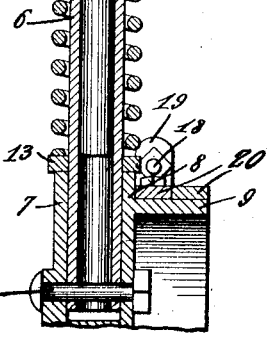
W.H.Metz, Inventor

UNITED STATES PATENT OFFICE.

WILLIAM H. METZ, OF McCRACKEN, KANSAS.

SPRING-WHEEL.

1,331,716.
Specification of Letters Patent.
Patented Feb. 24, 1920.

Application filed June 24, 1918. Serial No. 241,614.

*To all whom it may concern:*

Be it known that I, WILLIAM H. METZ, a citizen of the United States, residing at McCracken, in the county of Rush and State of Kansas, have invented a new and useful Spring-Wheel, of which the following is a specification.

This invention relates to spring wheels, one of its objects being to provide a novel arrangement of compression forming portions of the spokes of the wheel and which operate to provide resilient connections between the rim and hub of the wheel.

A further object is to provide tension springs for retarding the relative rotation of the hub and rim and for transmitting the pull from the hub to the rim or vice versa.

Another object is to provide a wheel which is simple, durable and compact, and the parts of which can be assembled and adjusted readily.

With the foregoing and other objects in view which will appear as the description proceeds, the invention consists of certain novel details of construction and combinations of parts which will be hereinafter more fully described and pointed out in the claims, it being understood that various changes may be made in the construction and arrangement of the parts without departing from the spirit or sacrificing any of the advantages of the invention as set forth in the appended claims.

In the accompanying drawings the preferred form of the invention has been shown.

In said drawings

Figure 1 is a side elevation of the wheel.

Fig. 2 is a section on line 2—2, Fig. 1.

Referring to the figures by characters of reference, 1 designates the rim of the wheel to the inner surface of which are secured, at regular intervals, short parallel plates 2 having inwardly extending flanges 3 the inner faces of which are concave as shown. The flanges of each pair of opposed plates thus form a trough adapted to receive and hold a ball 4 formed at one end of a rod which is member 5 in the form of a tubular spoke member 6. This member 6 extends between flanges 7 and 8 of the hub 9 and is pivotally connected thereto by a bolt 10, or in any other manner desired.

Each of the members 5 has a collar 11 near the ball 4 constituting an abutment for a washer 12 and another washer 13 extends around each member 6 and bears against the flanges 7 and 8 of the hub. A coiled spring 14 is mounted on each member 5 and the spoke member 6 into which it extends, and the spring bears at its ends against the respective washers 12 and 13. The balls 4 are held against detachment from the rim 1 by end plates 15 which are secured to the rim and extend across the ends of the spaces between the flanges 3. A pair of these end plates is provided for each ball and one of each pair is detachably held by a bolt 16, as shown. Thus the balls can be removed readily when desired.

Obviously the springs 14 will provide a resilient structure which will absorb all jars when the wheel is in use. In order, however, that the hub may be held against sagging within the rim of the wheel and the pull may be transmitted properly from the hub to the rim, coiled springs are arranged in opposed pairs as shown at 17, the outer ends of the springs being connected to certain of the plates 15 while the inner ends thereof are connected to eye bolts 18. These eye bolts are adjustably connected to the outstanding ears 19 at the ends of arcuate straps 20 extending partly around the hub 9, there being two oppositely disposed straps on the hub, one for each pair of springs 17. As the springs 17 are constantly under tension, they cause the straps 20 to frictionally engage the hub and be held practically immovable thereon. The springs of each pair converge from the rim inwardly toward the hub and, by means of the bolts 18, the tension of the springs can be varied at will. A pull exerted by the springs 17 upon the ends of the bands will hold said bands tightly upon the hubs.

The springs 14 of the spokes will absorb all shocks, as will be obvious and the springs 17, which pull against each other, serve to transmit the pull between the rim and hub and to hold the hub properly positioned under normal conditions. These springs 17, by reason of their use as resilient connections between the hub and rim also act as starters to assist in moving a vehicle having a heavy load, the rotation of the hub when driven by the engine, storing up energy in the springs until the resistance is overcome whereupon the stored energy will start the vehicle.

What is claimed is:

1. In a spring wheel the combination with a hub and a rim and spring controlled telescopic spokes connecting the hub and rim, of oppositely disposed bands each extending partly around the hub, a pair of springs connected to the ends of each band, the springs of each pair converging toward and secured to the rim, the said pairs being oppositely disposed.

2. In a spring wheel the combination with a hub and a rim, and spring controlled telescopic spokes connecting the hub and rim, of oppositely disposed bands arranged side by side and extending around the hubs, each band having outturned ears at its ends, coiled springs arranged in pairs, adjustable connections between the springs of one pair and the ears on one of the bands and between the springs of the other pair and the ears on the other band, and connections between the springs and the rim, each pair of springs being diametrically opposite the other pair.

In testimony that I claim the foregoing as my own, I have hereto affixed my signature in the presence of two witnesses.

WILLIAM H. METZ.

Witnesses:
JAS. H. LITTLE,
FRANK W. RUSSELL.